United States Patent
Mills

[11] Patent Number: 5,938,262
[45] Date of Patent: Aug. 17, 1999

[54] SLIDABLE TRUCK BED EXTENSION

[76] Inventor: Don W. Mills, 1310 Wedgecrest, Garland, Tex. 75040

[21] Appl. No.: 09/032,525

[22] Filed: Feb. 27, 1998

[51] Int. Cl.$^6$ ........................................................ B62C 1/06
[52] U.S. Cl. ............................................................ 296/26.09
[58] Field of Search .............................. 296/26.08, 26.09

[56] References Cited

U.S. PATENT DOCUMENTS

| | | | |
|---|---|---|---|
| 2,468,579 | 4/1949 | Vueri | 296/26 |
| 2,712,470 | 7/1955 | Cardini | 296/26 |
| 2,729,499 | 1/1956 | Eggum | 296/26 |
| 2,852,303 | 9/1958 | Hopson | 296/26.09 |
| 4,023,850 | 5/1977 | Tillery | 296/26 |
| 4,531,773 | 7/1985 | Smith | 296/26 |
| 4,932,703 | 6/1990 | Chamberlin et al. | 296/26 |
| 4,950,123 | 8/1990 | Brockhaus | 414/522 |
| 4,993,088 | 2/1991 | Chudik | 296/26.09 |
| 5,052,878 | 10/1991 | Brockhaus | 414/522 |
| 5,501,500 | 3/1996 | Cannon | 296/26 |
| 5,513,941 | 5/1996 | Kulas et al. | 296/26.09 |
| 5,649,731 | 7/1997 | Tognetti | 296/26.09 |

Primary Examiner—Gary C. Hoge
Attorney, Agent, or Firm—Joseph N. Breaux

[57] ABSTRACT

A slidable truck bed extension including a rigid extension plate having a first and second wheel well notch formed into the side thereof and a pair of connecting rails extending from the underside thereof, each connecting rail having a plurality of spaced pairs of upper and lower roller members rotatably mounted thereon; and first and second rail assemblies, each rail assembly including a support rail having a plurality of rail supports extending therefrom, each support rail having a diameter equal to the distance between the upper and lower roller members, each rail support being affixable to the existing bed of a pickup truck. In a preferred embodiment the bed extension plate further includes one or more spring loaded locking pins and one or more of the rail supports include a rail support locking pin aperture formed therein at a location such that the spring loaded locking pin is positionable in registration with and into the rail support locking pin aperture.

16 Claims, 3 Drawing Sheets

SLIDABLE TRUCK BED EXTENSION

TECHNICAL FIELD

The present invention relates to truck beds and more particularly to a slidable truck bed extension having an extension plate slidably mounted on a pair of rail assemblies mounted to the existing truck bed of a pickup truck or the like wherein the truck bed plate is provided with a pair of wheel well notches sized and positioned in a manner to allow the truck bed extension plate to slide fully into the existing truck bed.

BACKGROUND OF INVENTION

Many times the bed portion of a pickup truck is covered with a topper or other device for covering the truck bed and protecting items stored on the existing truck bed from the elements. Although the topper protects the items positioned on the existing truck bed it also limits access into the truck bed compartment. It would be a benefit, therefore, to have a slidable bed extension that could be mounted to the existing bed of a pickup truck that would allow an user to pull the slidable bed out past the tailgate of the truck for easy access to items positioned onto the slidable bed. It would be a further benefit to have a slidable bed extension that is easy to mount to the existing bed of a pickup truck. It would also be a benefit if the slidable truck bed extension included a locking mechanism for locking the slidable bed extension in a fixed position in either a fully forward position and a fully rearward position.

SUMMARY OF INVENTION

It is thus an object of the invention to provide a slidable truck bed extension that can be mounted to the existing bed of a pickup truck that can be pulled rearwardly out past the tailgate of the truck to allow for easy access to items positioned onto the slidable bed plate.

It is a further object of the invention to provide a slidable truck bed extension that is easily installed.

It is a still further object of the invention to provide a slidable truck bed extension that includes a locking mechanism for locking the slidable bed extension plate in a fixed position in either a fully forward position and a fully rearward position.

It is a still further object of the invention to provide a slidable truck bed extension that accomplishes all or some of the above objects in combination.

Accordingly, a slidable truck bed extension is provided. The slidable truck bed extension includes a rigid extension plate having a first and second wheel well notch formed into the side thereof and a pair of connecting rails extending from the underside thereof, each connecting rail having a plurality of spaced pairs of upper and lower roller members rotatably mounted thereon; and first and second rail assemblies, each rail assembly including a support rail having a plurality of rail supports extending therefrom, each support rail having a diameter equal to the distance between the upper and lower roller members, each rail support being affixable to the existing bed of a pickup truck. In a preferred embodiment the bed extension plate further includes one or more spring loaded locking pins and one or more of the rail supports include a rail support locking pin aperture formed therein at a location such that the spring loaded locking pin is positionable in registration with and into the rail support locking pin aperture.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY EMBODIMENTS

Figure 1:
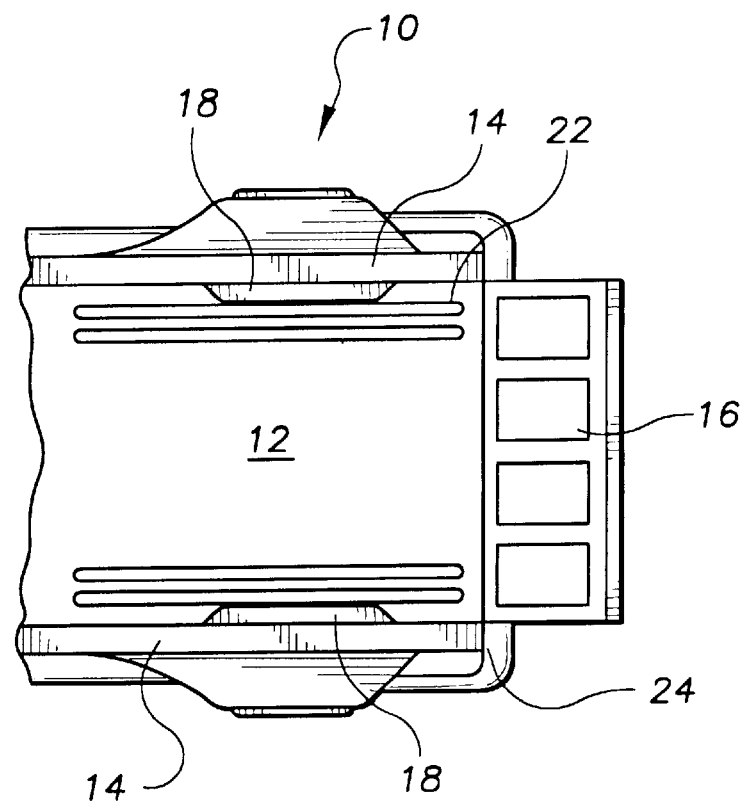
FIG. 1 is a top plan view of the bed of a representative pickup truck showing the existing truck bed, the wheel wells extending into the bed area, the tailgate, and the two rail assemblies from the slidable truck bed extension of the present invention.

FIG. 1 shows the tail end of a representative pickup truck generally designated by the numeral 10. Pickup truck 10 includes an existing truck bed 12 defined by a pair of sidewalls 14 and a tailgate 16. A pair of wheel well defining structures 18 extend partially into existing truck bed 12. Also showing in the figure are identical first and second rail assemblies 22,24 of the slidable truck bed extension of the present invention. In this embodiment rail assemblies 22,24 are bolted to existing truck bed 12 with a number of bolts.

Figure 2:
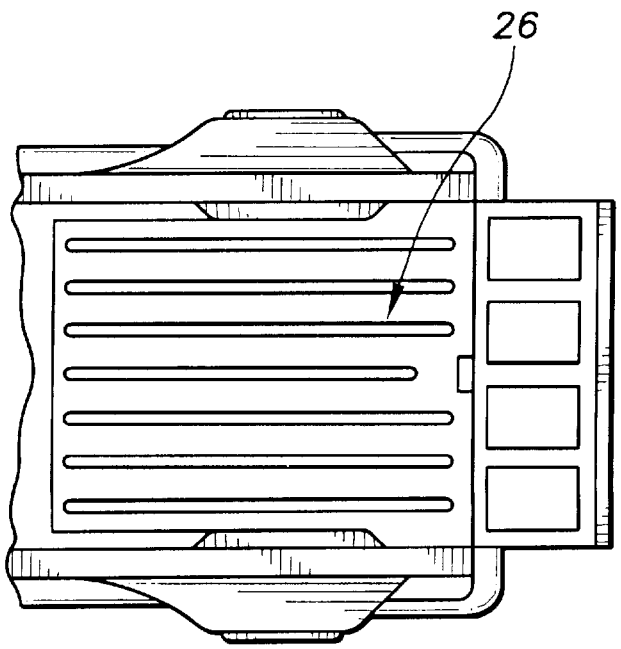
FIG. 2 is a top plan view of the representative pickup truck of FIG. 1 with the bed extension plate slidably mounted on the rail assemblies shown in FIG. 1 showing the bed extension plate positioned in the fully forward position with the wheel wells of the truck positioned into the wheel well notches of the extension plate and the locking pins holding the bed extension plate in the fully forward position.
Figure 3:
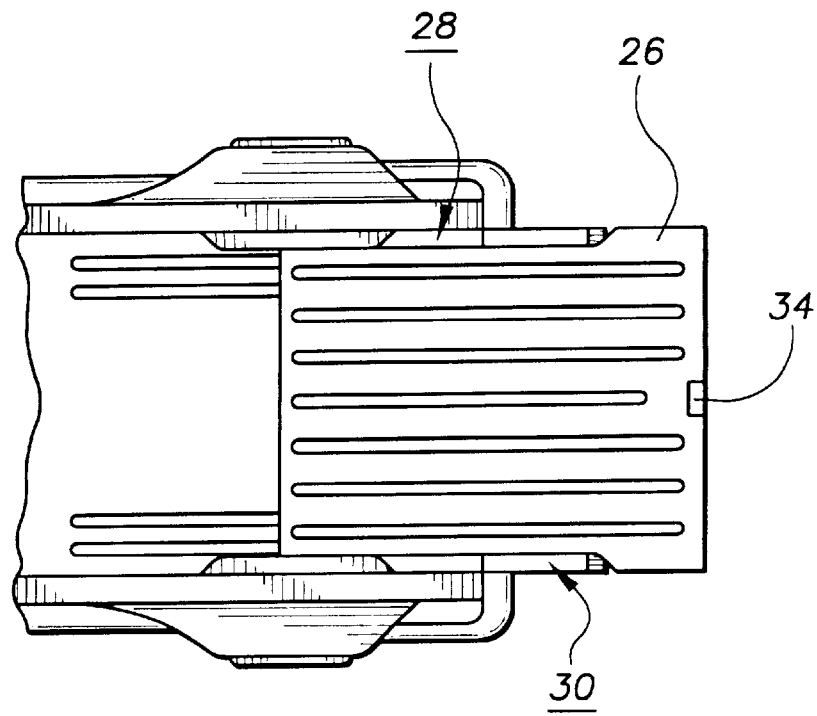
FIG. 3 is a top plan view of the slidable truck bed extension mounted within the existing bed of the pickup truck of FIG. 1 showing the bed extension plate positioned in a rearward position with the rear edge of the bed extension plate positioned past the tailgate of the pickup truck.

With reference now to FIG. 2, as described herein before the slidable truck bed extension of the present invention includes an extension plate, generally designated by the numeral 26, that is slidably mounted onto rail assemblies 22,24. Extension plate 26 is slidable between a fully forward position as shown in FIG. 2 and a fully rearward position as shown in FIG. 3. With further reference to FIG. 3, extension plate 26 has first and second wheel well notches 28,30 formed into the sides thereof to allow extension plate 26 to slide into the fully forward position. A handle 34 is provided at the rear edge of extension plate 26 to facilitate pulling extension plate 26 into the fully rearward position.

Figure 4:
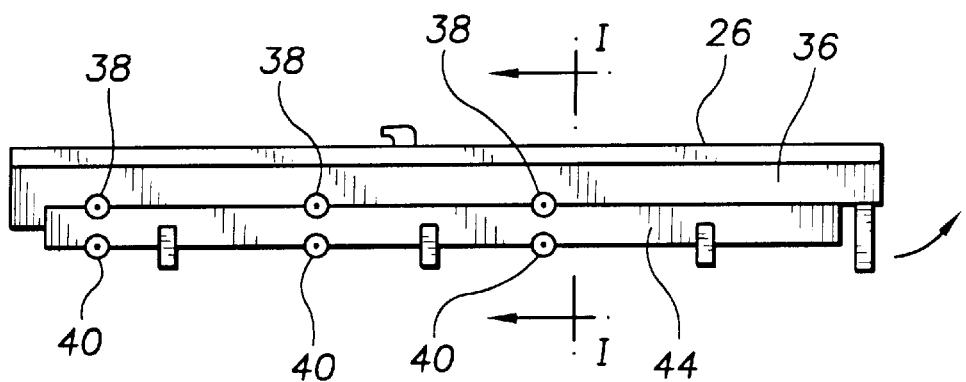
FIG. 4 is a side plan view showing the bed extension plate roller assembly positioned onto the one of the identical rail assemblies with the three pairs of upper and lower roller members slidably positioned on the support rail of the rail assembly.
Figure 5:
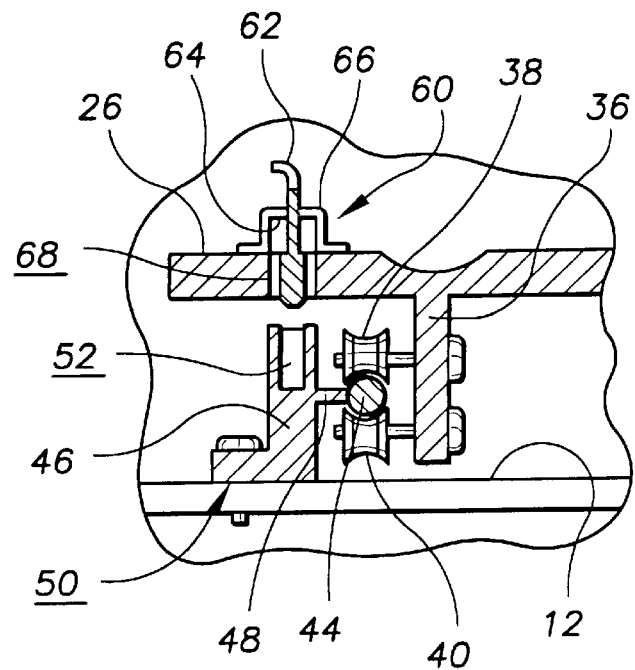
FIG. 5 is a cross section view across the bed extension plate and rail assembly of FIG. 4 showing one of the pairs of upper and lower roller members, the support rail, the spring loaded locking pin, the rail support, and the rail support locking pin aperture.

Referring now to FIG. 4, the underside of extension plate 26 is provided with a pair of parallel connecting rails 36 that provide support for the metal extension plate 26 and provide a location for rotatably mounting three pairs of upper and lower roller members 38,40. Referring now to FIG. 5, upper and lower roller members 38,40 are spaced apart a distance sufficient to just receive therebetween a support rail 44 of an identical rail assembly 22,24. Each support rail 44 is constructed from stainless steel shafting and, in this embodiment, is supported by three spaced rail supports 46. Each rail support 46 has a rod attachment tab 48, a securing bolt aperture 50 and a rail support locking pin aperture 52.

In this embodiment, bed extension plate 26 is provided with two spring loaded locking pin assemblies, generally designated by the numeral 60 (only one shown). Each locking pin assembly 60 includes a locking pin 62, a spring 64, a spring housing 66 and a pin aperture 68.

Figure 6:
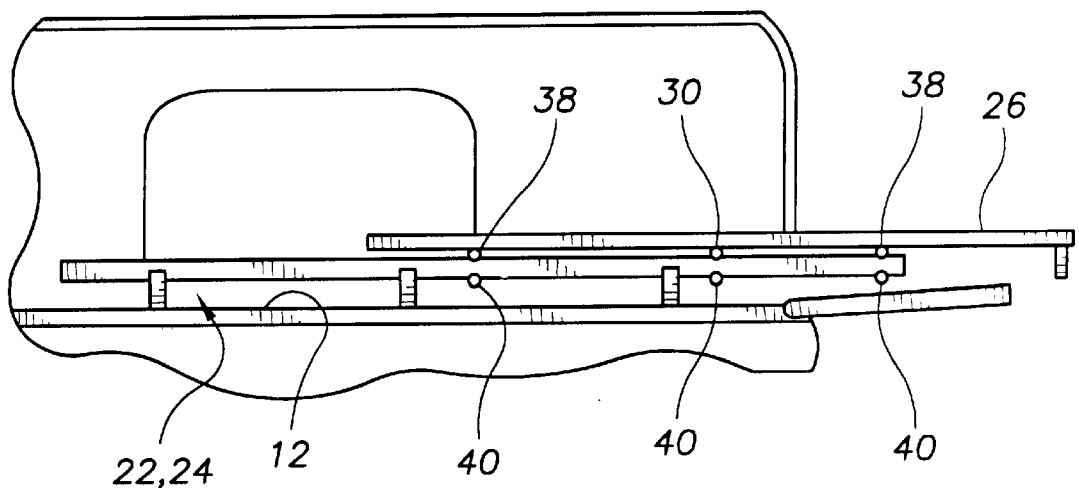
FIG. 6 is a side view showing one of the rail assemblies mounted to the existing bed and the bed extension plate slidably mounted onto the rail assembly.

Referring now to FIG. 6, each rail assembly 22,24 is bolted to existing bed 12 with bolts allowing extension plate 26 to move forward and rearward supported by upper and lower roller members 38,40. Lower roller members 40 prevent extension plate 26 from tipping when in the fully rearward position while upper roller members 38 support the downward weight of extension plate 26 and items placed thereon.

It can be seen from the preceding description that a slidable truck bed extension has been provided that can be mounted to the existing bed of a pickup truck; that can be pulled rearwardly out past the tailgate of the truck to allow for easy access to items positioned onto the slidable bed plate; that is easily installed; and that includes a locking mechanism for locking the slidable bed extension plate in a fixed position in either a fully forward position and a fully rearward position.

It is noted that the embodiment of the slidable truck bed extension described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A slidable truck bed extension comprising:
a rigid extension plate having a first and a second wheel well notch, respectively, formed into first and second opposed sides thereof and a pair of connecting rails extending from an underside thereof, each of said pair of connecting rails having a plurality of spaced pairs of upper and lower roller members rotatably mounted thereon; and first and second rail assemblies, each said rail assembly including a support rail having a plurality of rail supports extending therefrom, each said support rail having a diameter equal to a distance between said upper and lower roller members, each said rail support being affixable to a bed of a pickup truck;

said bed extension plate further including a spring loaded locking pin on each of said opposed sides;

each of said rail supports including a rail support locking pin aperture formed therein at a location such that one of said spring loaded locking pin is positionable in registration with and into said rail support locking pin aperture.

2. The slidable truck bed extension of claim 1, wherein: each said locking pin assembly includes a locking pin, a spring, a spring housing and a pin aperture.

3. The slidable truck bed extension of claim 1, wherein: each of said pair of connecting rails has three spaced pairs of upper and lower roller members rotatably mounted thereon.

4. The slidable truck bed extension of claim 1 wherein: each said rail assembly includes a number of holes provided therein through which securing bolts are positionable for securing each said rail assembly to a bed of a truck.

5. The slidable truck bed extension of claim 1 wherein: each said support rail is constructed from steel shafting and is supported by three spaced rail supports, each said rail support has a rod attachment tab extending therefrom and a securing bolt aperture and a rail support locking pin aperture provided therein.

6. The slidable truck bed extension of claim 2, wherein: each of said pair of connecting rails has three spaced pairs of upper and lower roller members rotatably mounted thereon.

7. The slidable truck bed extension of claim 2 wherein: each said rail assembly includes a number of holes provided therein through which securing bolts are positionable for securing each said rail assembly to a bed of a truck.

8. The slidable truck bed extension of claim 2 wherein: each said support rail is constructed from steel shafting and is supported by three spaced rail supports, each said rail support has a rod attachment tab extending therefrom and a securing bolt aperture and a rail support locking pin aperture provided therein.

9. The slidable truck bed extension of claim 6 wherein: each said rail assembly includes a number of holes provided therein through which securing bolts are positionable for securing each said rail assembly to a bed of a truck.

10. The slidable truck bed extension of claim 6 wherein: each said support rail is constructed from steel shafting and is supported by three spaced rail supports, each said rail support has a rod attachment tab extending therefrom and a securing bolt aperture and a rail support locking pin aperture provided therein.

11. The slidable truck bed extension of claim 9 wherein: each said support rail is constructed from steel shafting and is supported by three spaced rail supports, each said rail support has a rod attachment tab extending therefrom and a securing bolt aperture and a rail support locking pin aperture provided therein.

12. The slidable truck bed extension of claim 7 wherein: each said support rail is constructed from steel shafting and is supported by three spaced rail supports, each said rail support has a rod attachment tab extending therefrom and a securing bolt aperture and a rail support locking pin aperture provided therein.

13. The slidable truck bed extension of claim 3 wherein: each said rail assembly includes a number of holes provided therein through which securing bolts are positionable for securing each said rail assembly to a bed of a truck.

14. The slidable truck bed extension of claim 3 wherein: each said support rail is constructed from steel shafting and is supported by three spaced rail supports, each said rail support has a rod attachment tab extending therefrom and a securing bolt aperture and a rail support locking pin aperture provided therein.

15. The slidable truck bed extension of claim 13 wherein: each said support rail is constructed from steel shafting and is supported by three spaced rail supports, each said rail support has a rod attachment tab extending therefrom and a securing bolt aperture and a rail support locking pin aperture provided therein.

16. The slidable truck bed extension of claim 4 wherein: each said support rail is constructed from steel shafting and is supported by three spaced rail supports, each said rail support has a rod attachment tab extending therefrom and a securing bolt aperture and a rail support locking pin aperture provided therein.

\* \* \* \* \*